United States Patent [19]

Anderson

[11] 4,287,955

[45] Sep. 8, 1981

[54] ROTARY TILLER DEVICE

[76] Inventor: Jack F. Anderson, Marion, N. Dak. 58466

[21] Appl. No.: 46,160

[22] Filed: Jun. 7, 1979

[51] Int. Cl.³ .................... A01B 33/06; A01B 39/16; A01B 59/048

[52] U.S. Cl. .................... 172/98; 172/111; 172/114; 172/117; 172/82

[58] Field of Search ............ 172/5, 38, 47, 82, 83, 172/98, 99, 111, 114, 117

[56] References Cited

U.S. PATENT DOCUMENTS

| | | |
|---|---|---|
| 1,145,240 | 7/1915 | Gouldh |
| 1,664,789 | 4/1928 | Von Meyenburg |
| 2,489,633 | 11/1949 | Fulgham |
| 2,625,867 | 1/1953 | Hands, Jr. |
| 2,651,246 | 9/1953 | Peters et al. |
| 2,664,802 | 1/1954 | Myer |
| 2,718,836 | 9/1955 | Pertics et al. |
| 2,764,077 | 9/1956 | Pertics et al. |
| 2,774,292 | 12/1956 | Hartmann |
| 2,791,081 | 5/1957 | Allen et al. ............ 172/99 X |
| 2,990,890 | 7/1961 | Butterfield ............ 172/99 X |
| 2,991,838 | 7/1961 | Lane |
| 3,059,704 | 10/1962 | Kasatkin |
| 3,117,632 | 1/1964 | Caggiano |
| 3,138,208 | 6/1964 | Simms ............ 172/38 |
| 3,169,583 | 2/1965 | Thurow |
| 3,190,364 | 6/1965 | Maloney |
| 3,200,890 | 8/1965 | Courtway |
| 3,413,681 | 10/1968 | Lincoln et al. |
| 3,419,086 | 12/1968 | Giusti et al. |
| 4,044,839 | 8/1977 | Lely |
| 4,133,389 | 1/1979 | Ruhl |
| 4,206,580 | 7/1980 | Troax et al. |

*Primary Examiner*—Paul E. Shapiro
*Attorney, Agent, or Firm*—Young & Martin

[57] ABSTRACT

A rotary tiller device with a rotor disposed for rotation about a vertical axis is adapted for mounting on the lift arms of a mobile vehicle and includes a yieldable arm suspension mechanism and spring tiller teeth depending downwardly from the rotor, both of which in combination with each other provide uniform tillage depth control of the device. The rotor assembly can be moved laterally inwardly and outwardly with respect to the frame, and the beam can be adjustably swiveled about a vertical axis such that the rotor can be positioned to the left side, right side, or front of the frame or vehicle.

21 Claims, 16 Drawing Figures

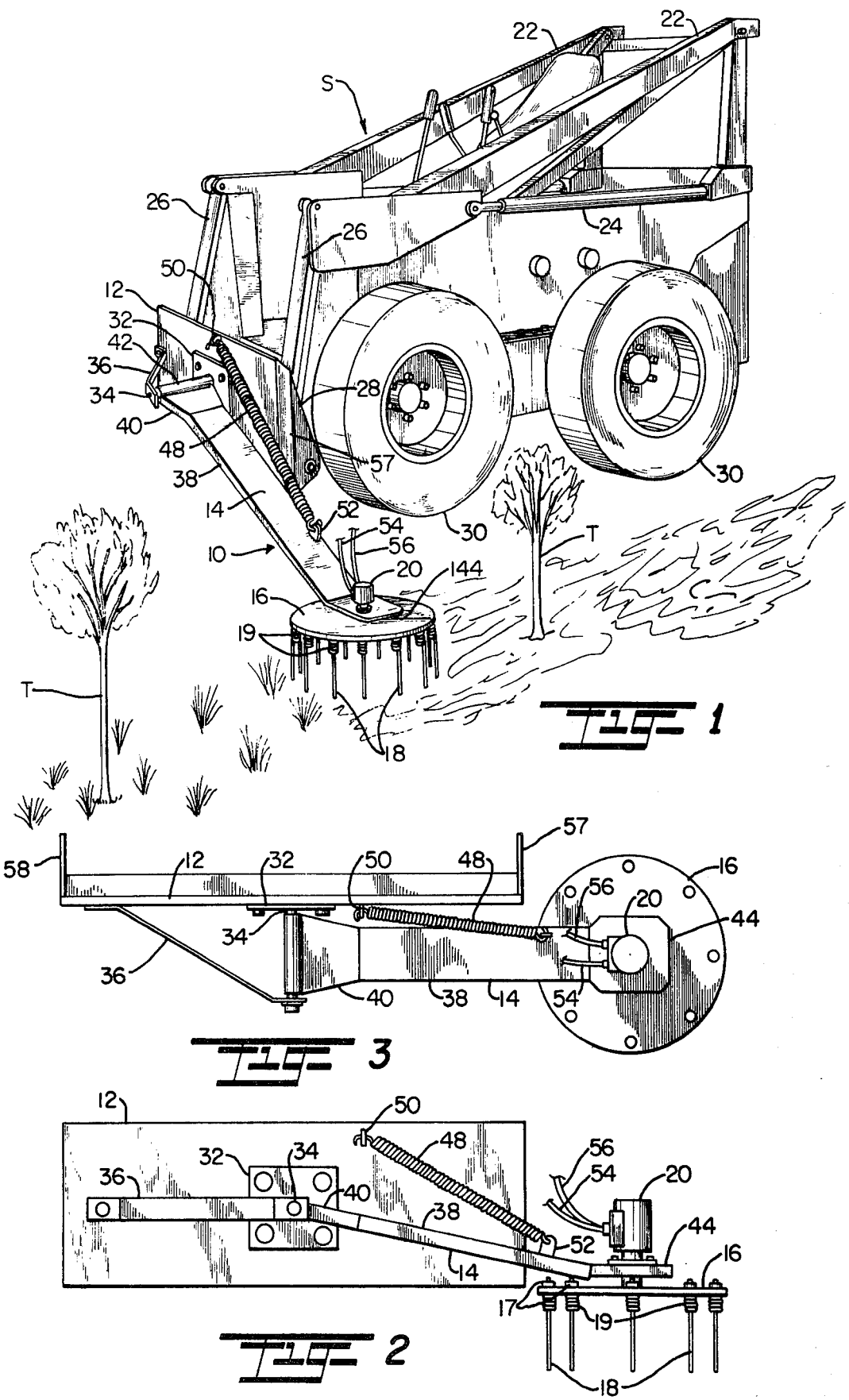

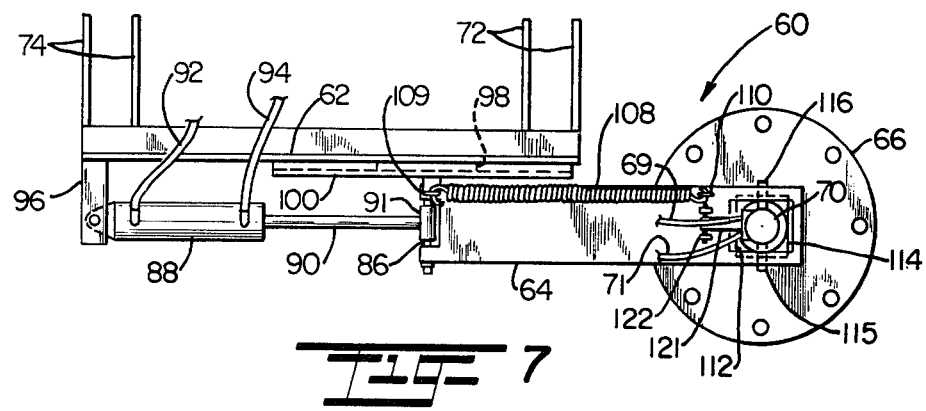
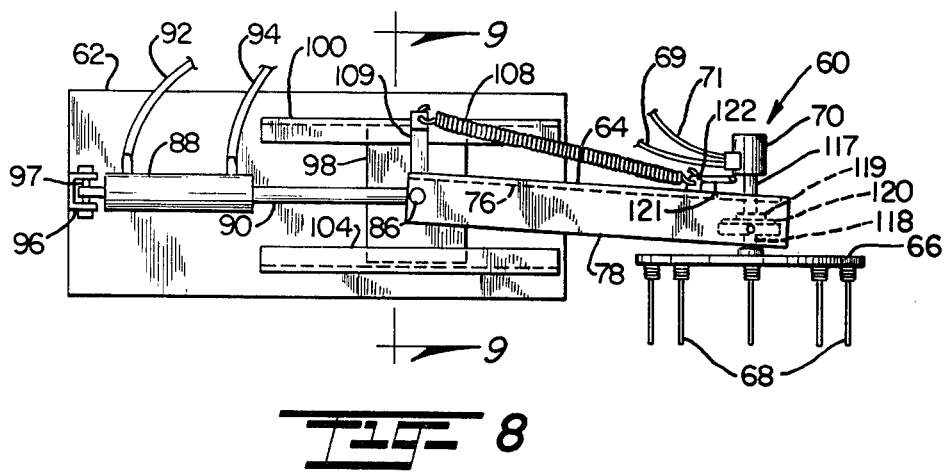
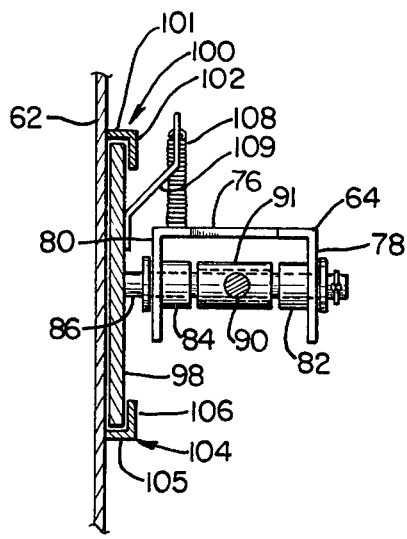

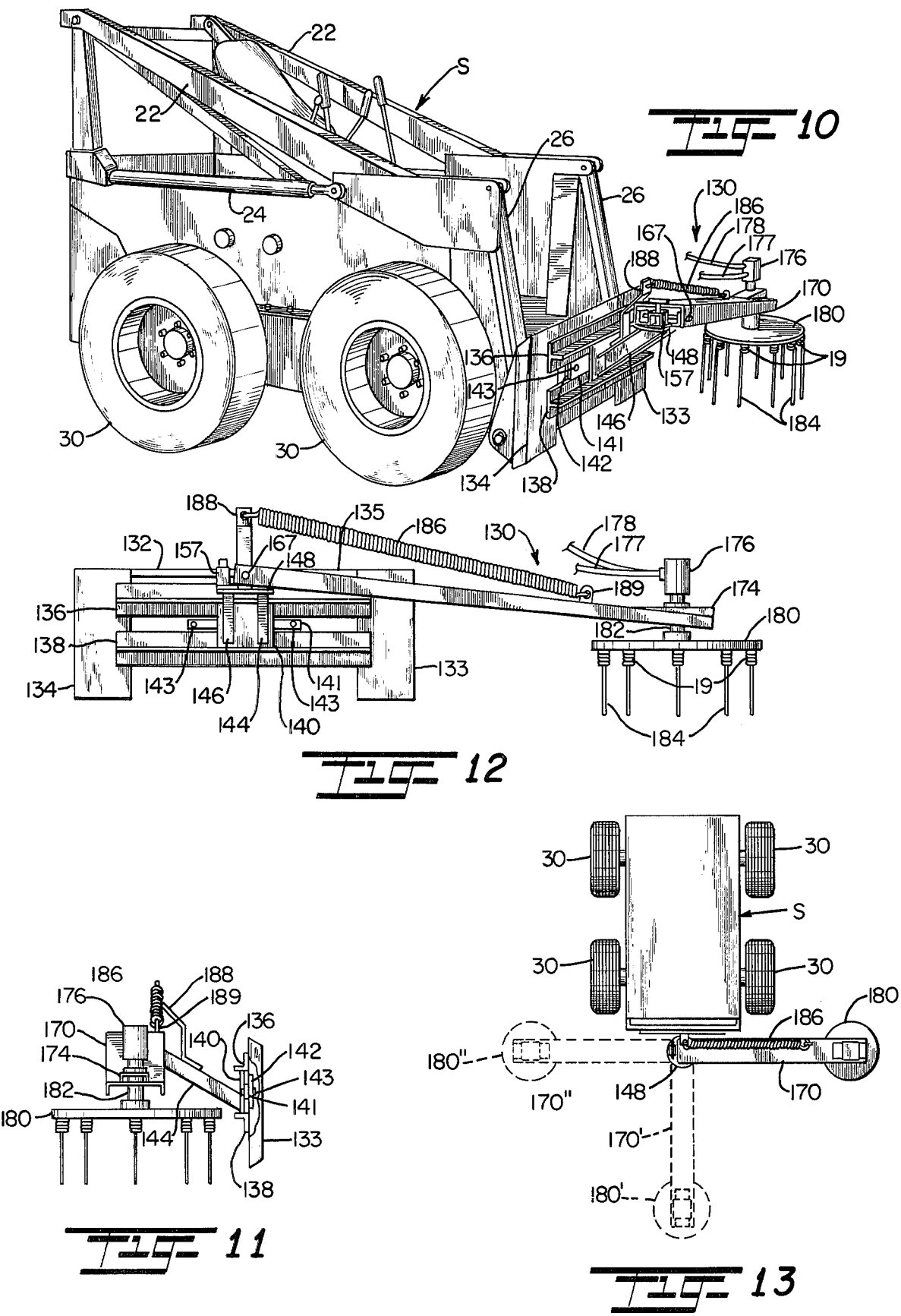

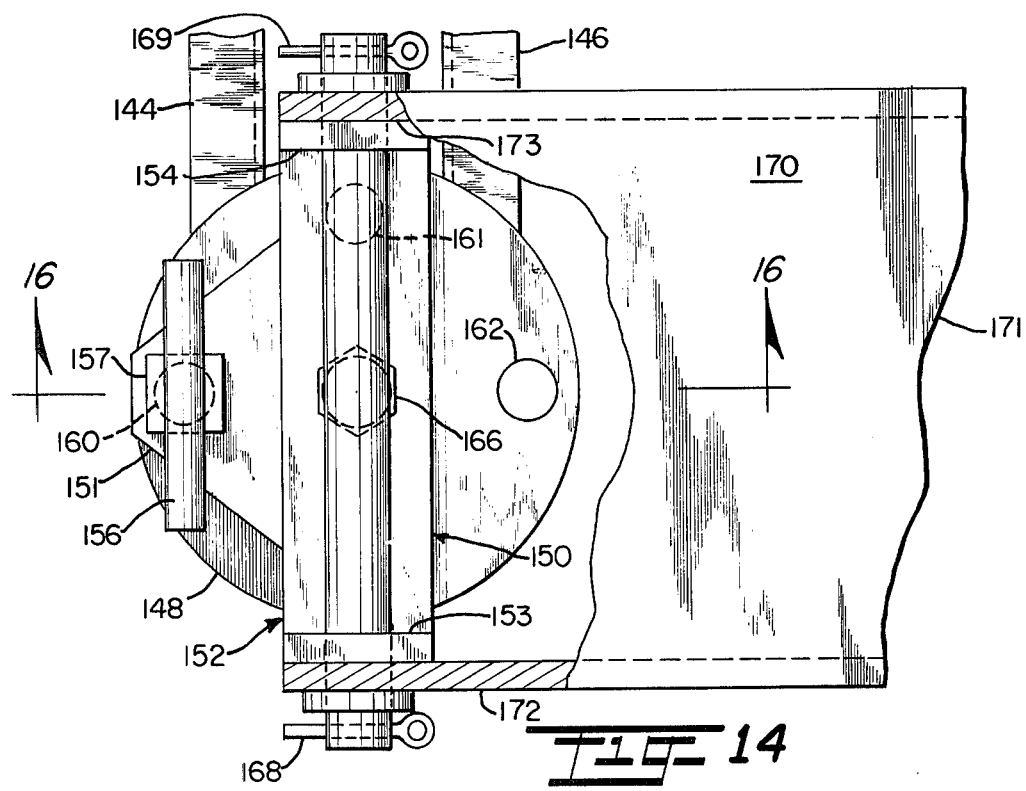
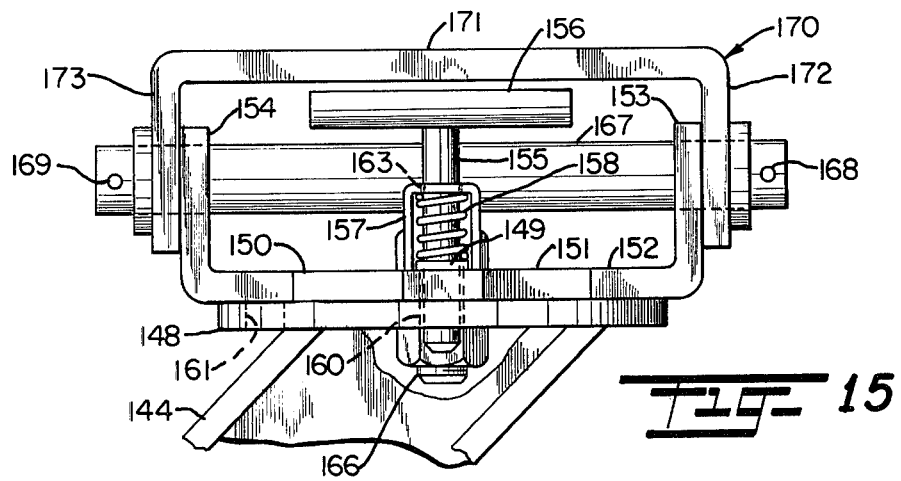
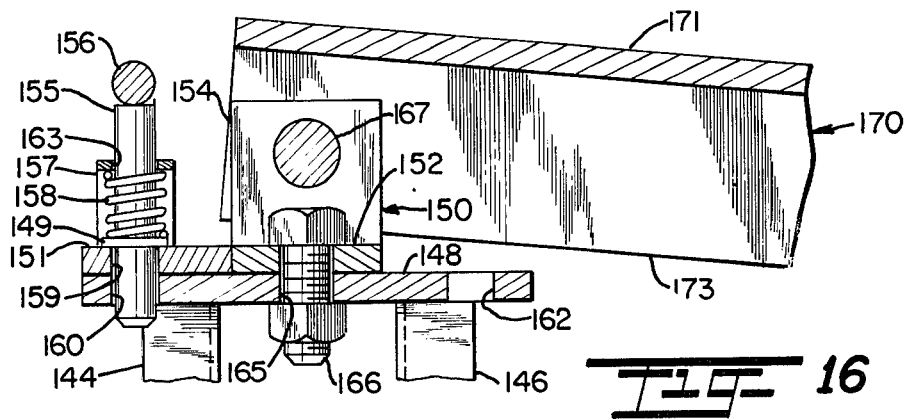

ROTARY TILLER DEVICE

BACKGROUND OF THE INVENTION

The present invention relates generally to tillers, and more particularly to a novel and improved rotary tiller adapted for tilling soil between plants in a row and other areas normally difficult to reach.

Cultivating or tilling the ground between plants in a row to control weed growth is desirable for optimum plant growth and good husbandry. In the past, such tilling between plants in a row was accomplished by manual labor, such as with the use of hoes. The cost of manual labor and the vastly increased sizes of crops and trees planted in rows in modern times as well as the desire for more convenience resulting has rendered manual labor for such tasks obsolete. Tilling the area between adjacent rows is easily accomplished mechanically with machines or cultivators mounted on tractors and the like. However, such conventional machines are usually not effective for tilling the area between plants in a row because the machines are too large and cumbersome to steer into and out of the typically limited space between the plants in a row without disturbing the plants. Consequently, a number of tiller machines have been devised for mounting on mobile vehicles such as tractors and adapted for moving into and out of the space between plants in a row in order to accommodate tilling the ground between the plants in a row while the tractor continues on a substantially straight course parallel to the row. The following patents disclose examples of such devices: U.S. Letters Pat. Nos. 2,664,802 issued to I. Myer; 2,718,836 issued to E. P. Pertics et al; 2,764,077 issued to E. P. Pertics et al; 3,117,632 issued to V. G. Caggiano, Jr.; 3,138,208 issued to S. G. Simms; and 3,913,681 issued to W. D. Lincoln et al. All of these prior art patents disclose rotary tiller machines mounted on tractors and include some mechanism for moving the tiller laterally in relation to the tractor into and out of the area between the plants in a row. While all of these devices have enjoyed various degrees of success in effectively tilling the area between plants in a row, there are still a number of drawbacks associated with them. For example, the prior art devices typically include complicated mechanically or hydraulically controlled apparatus for extending and retracting the tiller into and out of the row. Some also lack sufficient effective depth control to accommodate smooth operation, particularly over varying terrain or soil and weed conditions, and they are not usable for reaching and tilling other typically difficult to reach areas such as fence corners, rear buildings, between protruding objects, and the like.

During the past several years, small versatile vehicles known as "skid turn" vehicles have been developed and have become increasingly popular for use primarily as front end loader vehicles. These vehicles are characterized by quick, pivotal steering manueverability accomplished by the rather unconventional manner of steering by slowing, stopping or reversing the rotation of drive wheels on one side of the vehicle in relation to the wheels on the opposite side. The applicant of this invention discovered the feasibility potential of such skid turn vehicles for cultivating or tilling between plants in a row with appropriate accessory equipment therefor.

SUMMARY OF THE INVENTION

Accordingly, it is also an object of the present invention to provide rotary tiller apparatus adapted for mounting on and use in conjunction with a skid turn vehicle and having depth control features particularly conducive for such use.

It is also an object of the present invention to provide a rotary tiller device for tilling the area between plants in a row which, when mounted on and used in conjunction with a skid turn vehicle does not require extension or retraction apparatus.

It is also an object of the present invention to provide such a tiller device with auxiliary extension and retraction means for adjustably setting the lateral distance outward of the rotary tiller from the skid turn vehicle.

A still further object of the present invention is to provide a versatile rotary tiller device wherein the rotary tiller can be selectively positioned to extend outwardly of the left side, right side, or the front of the vehicle on which it is mounted.

Another object of the present invention is to provide a relatively uncomplicated versatile, convenient, controllable rotary tiller device adapted especially for use on conventional skid turn vehicles or vehicles with similar steering and control characteristics to skid turn vehicles for tilling between plants in a row, as well as areas in fence corners, rear buildings, between protruding objects, and areas otherwise difficult to reach with conventional tilling equipment, which effectively utilizes the steering manueverability characteristics of such vehicles as well as the lifting and tilting mechanisms conventionally provided thereon.

The rotary tiller device of the present invention has a main support frame adapted for mounting on conventional lift arms of a mobile vehicle, such as a skid turn vehicle, yieldable arm, suspension mechanism extending laterally outward from the main support frame and pivotally attached to the frame in such a manner that the distal end of the suspension mechanism is movable upwardly and downwardly in relation to the frame, a rotor member disposed under the distal end of the suspension mechanism for rotation about a substantially vertical shaft, a plurality of resilient spring steel teeth are attached to and depend downwardly from the rotor member, and a hydraulic motor mounted on the distal end of the suspension mechanism and connected to the rotor by a vertical drive shaft for rotating the rotor. The combination of the characteristic action of the resilient spring steel teeth in the ground with the effect of the balance spring suspension mechanism results in a mechanism which tends to "float" to some extent, thereby effectively tilling the ground while avoiding insufficient depth or gouging to excessive depth, regardless of variations in terrain. This depth control feature is further enhanced by slightly tilting the rotary member in such a manner that the forward leading aspect of the rotary disk is spaced farther upward from the ground than the rear trailing aspect of the disk which also contributes to the tendency of the tiller to "float" along the surface of the ground with sufficient cultivation while avoiding gouging or digging to excessive depths in the ground.

The device also includes mechanism for slidably adjusting the lateral distance of the rotor assembly from the vehicle. Another feature included in the invention which is especially adapted for use in conjunction with a skid turn vehicle, is a suspension mechanism which is not only pivotal upwardly and downwardly in relation to the support frame but also is rotatable to a number of positions from the left side of the vehicle to the right side of the vehicle, including a position extending straight forward of the vehicle, and releasable latch or locking mechanism for locking the beam in a selected one of those positions.

BRIEF DESCRIPTION OF THE DRAWINGS

Other objects, advantages, and capabilities of the present invention will become apparent as the description proceeds taken in conjunction with the accompanying drawings, in which:

FIG. 1 is a perspective view of one embodiment of the tiller device of the present invention shown mounted on a conventional skid turn vehicle and shown tilling the area between seedling trees planted in a row;

FIG. 2 is a front elevation view of the rotary tiller device of the present invention shown in FIG. 1;

FIG. 3 is a plan view of the rotary tiller device shown in FIG. 1;

FIG. 7 is a plan view of an alternate embodiment of the rotary tiller of the present invention including apparatus for extending and retracting the rotary tiller in relation to the vehicle;

FIG. 8 is a front elevation view of the alternate embodiment shown in FIG. 7;

FIG. 9 is a sectional view of the alternate embodiment of FIGS. 7 and 8 taken along lines 9—9 in FIG. 8;

FIG. 10 is a perspective view of another alternate embodiment of the present invention shown mounted on a conventional skid turn vehicle, this alternate embodiment having a beam which can be rotated from one side of the vehicle to the other, including an intermediate front position;

FIG. 11 is a side elevation view of the tiller device shown in FIG. 10 taken from the left side of the vehicle;

FIG. 12 is a front elevation view of the tiller device shown in FIG. 10;

FIG. 13 is a plan view of the tiller device shown in FIG. 10 shown mounted on a skid turn vehicle, with alternate positions of the beam and rotary tiller being shown in broken lines;

FIG. 14 is an enlarged plan view of the rotatable attachment of the beam to the support frame, a portion of the top plate of the beam being cut away to reveal the adjustable rotating assembly;

FIG. 15 is an enlarged side elevation of the rotatable connection assembly shown in FIG. 14; and FIG. 16 is a cross-sectional view of the rotatable attachment of the beam to the main frame taken along lines 16—16 in FIG. 14.

DETAILED DESCRIPTION OF THE PREFERRED EMBODIMENT

Figure 6:
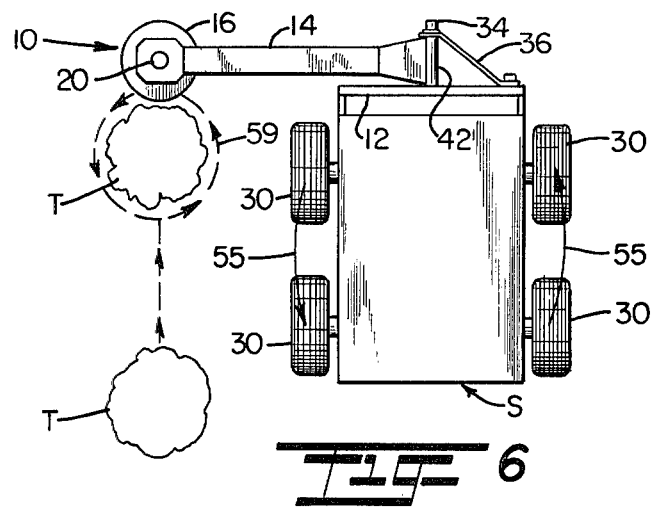
FIGS. 4, 5 and 6 illustrate the progressive steering and positioning of the vehicle and rotary tiller device as it manuevers between and around seedling trees planted in a row.

The rotary tiller device 10 of the present invention is shown in FIG. 1 mounted on the lift arms 22 of a conventional skid turn vehicle S. It is particularly adapted for use in conjunction with such a skid turn vehicle S for tilling or cultivating the area between plants in a row, such as the seedling trees T shown in FIG. 1, as will be described more thoroughly herein.

Basically, the rotary tiller device 10 of the present invention, as best seen in FIGS. 1, 2 and 3, is comprised of a main frame 12, a yieldable arm suspension mechanism including a pivotally mounted beam 14, a circular disk rotor 16 mounted at the distal end of the suspension mechanism with spring steel teeth 18 attached to and depending downwardly from the disk rotor 16, and a hydraulic motor 20 for turning the disk rotor 16. The beam 14 is pivotally connected to the main frame plate 12 by a pivot pin 34 extending horizontally outward in a forward direction from the main frame plate 12. The pivot pin 34 is rigidly affixed to a base plate 32 which is secured to the main frame plate 12.

The beam 14 is comprised of an elongated channel midsection 38 with a flared end section 40 on one end and a flattened motor mount section 44 on the opposite distal end. A sleeve 42 is affixed to the flared section 40 and is slidably mounted on the pivot pin 34 in such a manner that the beam 14 extends laterally outward from the main frame plate 12 in a pivotal manner such that the distal end 44 of the beam 14 is movable upwardly and downwardly in relation to the main frame plate 12.

In its normal position, the beam 14 extends outwardly and downwardly from the main frame plate 12. The distal end 44 of the beam 14 is angled to the channeled midsection 38 to provide a horizontal mounting plate for the hydraulic motor 20.

Brace 36 extends outwardly at an angle from the main frame plate 12 and is connected to the distal end of the pivot pin 34 to provide additional support for the pivot pin 34.

The disk rotor plate 16 is positioned under the distal end 44 of the beam 14 in a substantially horizontal plane. A drive shaft 46 is connected to the center of the disk rotor 16 and extends substantially vertically upward therefrom. The hydraulic motor 20 is mounted on the distal end plate 44 with its shaft aligned with and coupled with the drive shaft 46. A plurality of spring steel teeth 18 with coiled sections 19 near their tops are secured to the periphery of the disk rotor 16 in spaced-apart relation to each other, and the hydraulic motor 20 is effective to rotate the drive shaft 46 and disk rotor 16 with the teeth 18 about the axis of the drive shaft 46. Each tooth 18 is an elongated strand of spring steel, a portion of which is coiled with one end in the form of an elongated shank extending downwardly from the coiled portion and the other end being threaded and extending upwardly from the coiled portion through a hole in the disk rotor 16 where it is fastened with a nut 17.

A coiled balance spring 48 is attached at one end to an ear 50 affixed to the main frame plate 12 and at the other end to an ear 52 affixed to the beam 14 near its distal end 44. The balance spring 48 is mounted in tension to provide somewhat of a lifting force vector to the rotor to partially offset the weight effect of gravitational force on the rotor.

Figure 5:
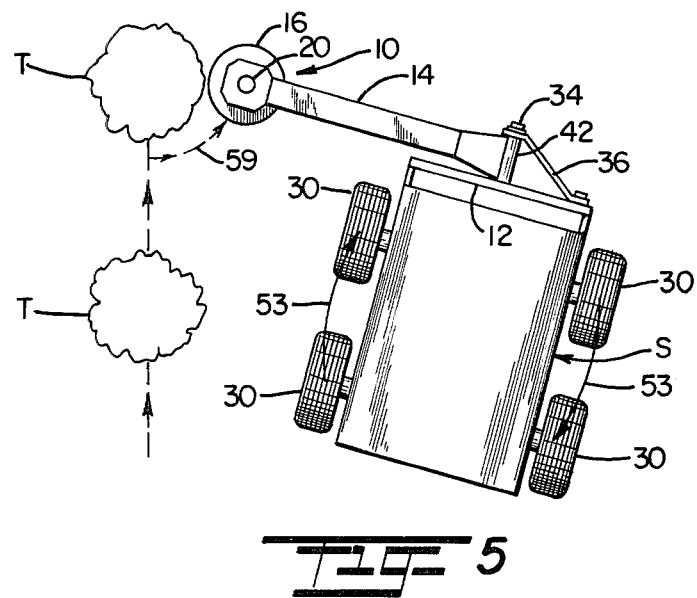
Figure 4:
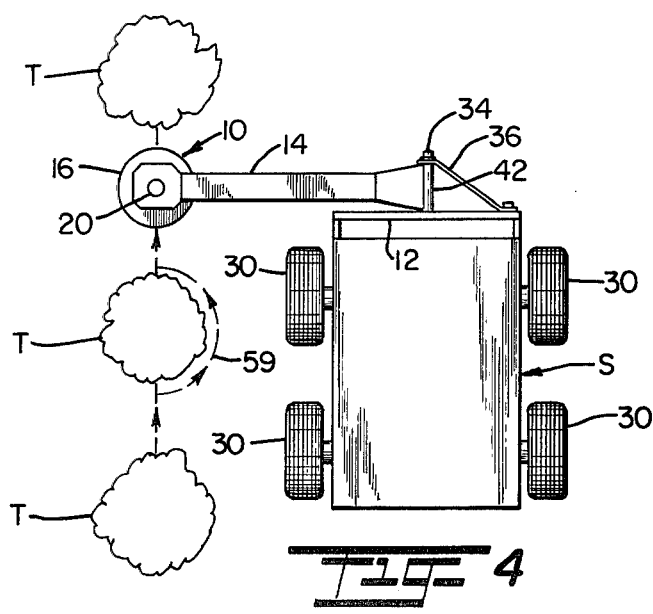

In operation, hydraulic fluid is pumped and circulated through the hydraulic motor 20 through hydraulic lines 54, 56 to turn the rotor. As mentioned above, the rotary tiller device 10 of the present invention is specifically adapted for use on a skid turn vehicle S or other mobile vehicles having steering and manueverability characteristics similar to skid turn vehicles, it could also be used for some applications on normal front wheel, rear wheel, or articulated steered vehicles. Skid turn vehicles are steered by slowing, stopping, or reversing the wheels on one side of the vehicle as the wheels on the opposite side continue to turn. The resulting steering characteristic of skid turn vehicles, including almost instantaneous pivoting of the vehicle and a high degree of control is important to the design of the rotary tiller device of the present invention. Because of the steering and control characteristics of the spin turn vehicle S, no mechanism is required for extending and retracting the rotor into and out of the row of plants. On the contrary, steering the vehicle itself is satisfactory to manuever the rotating tiller around the plants T in the row as shown in FIGS. 4 through 6. The vehicle and rotary tiller shown in FIG. 4 is approaching a tree T, as shown by the broken arrows 59. In FIG. 5, the vehicle S and rotor 16 are shown being manuevered around the tree T by use of the pivotal steering characteristic of the skid turn vehicle as indicated by arrows 53. In FIG. 6, the vehicle S and rotor 16 are shown pivoted back as indicated by arrows 55 to a position to proceed forwardly parallel with the row until another tree T is encountered. Also as shown in FIG. 6, if the plants are short enough for the beams 14 to pass thereover, the rotor 16 can be manuevered or steered in a complete circle around the plant T if desired before continuing forward progress as shown by broken arrows 59.

As mentioned above, the rotary tiller device 10 of the present invention is adapted for attachment to the lift arms 22 of the skid turn vehicle S as shown in FIG. 1. In fact, the main frame plate 12 is equipped with brackets 57, 58 which are adapted for mounting on the accessory mounting plate 28 that is supplied as standard equipment on most skid turn vehicles S. The hydraulic cylinders 26 are provided to tilt the accessory mounting plate, thus they can be utilized to tilt the rotary tiller device 10 of the present invention. The lift arms 22 can be raised or lowered by hydraulic cylinders 24 to position the teeth 18 on the ground. The balance spring 48 if the suspension mechanism is designed to have sufficient tension to allow the approximate optimum amount of weight of the rotor, beam, and motor to act downwardly on the rotor teeth 18. The combination of the characteristic action of the flexible teeth 18 with the balance spring suspension mechanism is effective to allow the tiller to proceed tilling at a sufficient depth to eradicate most common weeds between the plants in a row, yet with sufficient "float" to avoid any gouging or digging down to excessive depths which normally occurs when solid or rigid teeth are used. It is significant that the effective depth control resulting from this combination of features is accomplished without the necessity of gauge wheels, ground shoes, or the like, and without having to rely on the lift mechanism for depth control as do other prior art devices which would not be satisfactory for uneven terrain or use in difficult to reach places where sharp turns and short reversing movements in all directions are required. To further assist in this regard, the hydraulic cylinders 28 can be activated to tilt the rotary tiller device 10 such that the forward aspect of the disk rotor 16 is spaced a higher distance above the ground than the rear aspect thereof. When so adjusted, the rotary tiller exhibits improved floating characteristics for sufficiently tilling the ground yet not gouging or digging in, even over variations in terrain.

An alternate embodiment 60 of the rotary tiller device of this invention is shown in FIGS. 7 through 9. This rotary tiller device 60 is substantially the same as the above-described embodiment 10, with the additional feature of slidably mounting the beam 64 to the main frame plate 62 in a manner such that the rotor plate 66 can be extended or retracted in relation to the main frame 62. Although this feature could be used to extend and retract the rotor 16 into and out of a row of plants, such use is not necessary due to the manueverability of the skid turn vehicle S as described above. This extendable and retractable feature is provided primarily for spacing the rotor a further distance outwardly from the vehicle S if desired, for example, for manuevering the rotor in a complete circle around the plants in a row similar to the movement illustrated in FIG. 6, which requires more space between the rotor and the vehicle.

As best seen in FIGS. 7 through 9, this alternate embodiment 60 is comprised of a main frame plate 62 with brackets 72, 74 extending rearwardly thereof for mounting on the accessory mounting plate of a skid turn vehicle. The beam 64 is pivotally mounted on pivot pin 86 and extends laterally outward from the main frame plate 62.

The pivot pin 86 is affixed to and extends outwardly from a slidable support plate 98 which is slidably connected to the main frame plate 62. The support plate 98 is slidably secured to the main frame support 62 by an upper guide 100 and lower guide 104 affixed to the main frame plate 62 in horizontal positions in spaced-apart relation to each other respectively. A downwardly opening channel is formed between the horizontally outwardly extending portion 101 and vertically downwardly extending portion 102 of the upper guide 100 as best seen in FIG. 9. Likewise, an upwardly opening channel is formed outwardly extending portion 105 and upwardly extending portion 106 of lower guide 104. The support plate 98 is slidably received in said channels between said upper and lower guides 100, 104, respectively and is retained therein.

A support arm or beam 64 is in the form of an elongated channel having a top plate 76 and opposite spaced-apart side plates 78, 80 extending downwardly from opposite sides of the top plate 76. Two spaced-apart sleeves 82, 84 are positioned in one end of the support arm or beam 64, and the pivot pin 86 extends through the sleeves 82, 84 to pivotally mount the beam 64. A hydraulic cylinder 88 and ram 90 is anchored to one side of the main frame plate 62 by bracket 96 and pin 97, and the ram 90 is connected by a sleeve 91 at the distal end of the ram 90 to the pivot pin 86. Consequently, when hydraulic fluid is circulated into the cylinder 88 through hoses 92, 94, the beam 64 can be moved laterally outwardly and inwardly in relation to the main frame plate 62, with the support plate 98 sliding laterally within the upper and lower guide members 100, 104 as described above.

A balance spring 108 is also provided in this embodiment extending between a mounting bracket 109 affixed to the support plate 98 and an ear 110 attached near the distal end of the beam 64 for depth control as described above for the first embodiment.

This embodiment also includes a pivotal mounting plate 114 for the hydraulic motor 70 and drive shaft 118 for the circular disk rotor 66. The drive shaft 118 extends through the mounting plate 114 and through bearing housing 120 which is mounted on the top of the mounting plate 114. The shaft 117 of the hydraulic motor 70 is connected by coupling 119 to the drive shaft 118, and the lower end of the drive shaft 118 is attached to the center of the disk rotor 66.

The plate 114 has a stub shaft 115 extending forwardly therefrom and a similarly aligned stub shaft 116 extending rearwardly therefrom. The forward stub shaft 115 extends through a hole in the front side plate 78 of the beam 64, and the rear stub shaft 116 extends through a similarly aligned hole in the rear plate 80 of the beam 64 such that the mounting plate 114 is freely pivotal in the distal end of the beam 64 about an axis through the stub shafts 115, 116. An opening 112 is provided in the top plate 76 of the beam 64 over the mounting plate 114 to accommodate the motor 70 and shaft 118. Therefore, the disk rotor 66 and spring teeth 68 depending downwardly from the rotor 66 can pivot or tilt about the axis through the stub shafts 115, 116 to adjust automatically to a laterally sloping terrain. Of course, the rotor 66 and teeth 68 also "float" up and down to adjust to changing terrain in relation to the vehicle S by the pivotal arm 64 pivoting about the pivot pin 86, aided by the balance spring 108, as described above.

The hydraulic motor 70 turns the rotor 66 and teeth 68 when hydraulic fluid is circulated therethrough through hydraulic lines 69, 71. A pivotal torque arm 121 is pivotally connected to the hydraulic motor 70 at one end and to a pivot mounting 122 at the other end to prevent the housing of the motor 70 from turning while not interfering with the pivoting or tilting movement of the rotor 66 in response to changes in terrain.

Another alternate embodiment 130 of the present invention is shown in FIGS. 10 through 16. This embodiment 130 is also uniquely designed and adapted for use on a skid turn vehicle S as shown in FIG. 10. A significant feature of this embodiment is the combination rotatable and pivotal connection of the support arm or beam 170 to the main frame 132. This feature accommodates positioning the disk rotor 180 on either the left side of the skid turn vehicle S, or, alternatively to a position extending directly to the front of the vehicle S as shown in broken lines at 170', 180', or to the right side of the vehicle S as shown in broken lines at 170'', 180'' in FIG. 13. Again, this feature is particularly adaptable for use with a skid turn vehicle to utilize the unique steering and control characteristics of such a vehicle to cultivate or till areas difficult or impossible to reach by conventional or prior art cultivators. For example, in the forward position, this alternative embodiment 130 of the rotary tiller device can be used with a high degree of manueverability and control to work in fence corners, close around buildings, between protruding objects or behind trees where objects, ditches, or the like prohibit driving a vehicle to the rear side, between protruding objects, and the like.

This alternate embodiment 130 has a main frame 132 on the lift arms 22 of the skid turn vehicle S. As best seen in FIGS. 10 through 12, the main frame 132 includes a left side plate 133, right side plate 134, and cross member 135. An upper guide member 136 and lower guide member 138 extend horizontally between the left and right side plates 133, 134 in parallel spaced-apart relation to each other. A slidable support plate 140 is positioned between the guide members 136, 138, and an elongated slot plate 141 is fixed to the back side of the support plate 140 and positioned between adjacent elements of the guide members 136, 138. A retainer plate 142 is positioned on the back side of the guide members 136, 138 and is fastened to the slot plate 141 by bolts 143. Thus, it can be seen that the support plate 140 can be slidably moved laterally left or right within the guide members 136, 138, to any desired position and secured in such position by tightening the bolts 143 to clamp the retainer plate 142 against the guide members 136, 138.

Two support members 144, 146 extend outwardly and upwardly from the support plate 140 to a position in front of the main frame 132. A table support plate 148 is affixed to the support members 144, 146 in a substantially horizontal position, as best seen in FIGS. 14 through 16. A U-shaped swivel member 150 having a bottom portion 152 and two spaced-apart upwardly extending ears 153, 154, respectively, extending upwardly from opposite sides of the strap 152. The swivel member 150 is positioned on the table plate 148 and is rotatably secured thereon by kingpin 156 extending through hole 164 in the center of the strap 152 and through hole 165 in the center of the table plate 148, in such a manner that the swivel member 150 is rotatable on the table plate 148.

The support arm or beam 170 in the form of an elongated channel having a top plate 171 and side plates 172, 173 is mounted on pivot pin 167, which extends through the ears 153, 154 and the side plates 172, 173 and is retained therein by cotter pins 168, 169 through respective opposite ends of the pivot pin 167. Thus the distal end of the beam 170 is pivotal upwardly and downwardly as in the previously described embodiments as well as rotatable horizontally from one side of the vehicle to the other.

Also as best seen in FIGS. 14 through 16, a latching or locking mechanism is provided for locking the beam 170 selectively in the position to the right of the vehicle, to the left of the vehicle, or in front of the vehicle as desired. The locking mechanism includes a plurality of holes 160, 161, 162 through the table plates 148 at equal radially spaced distances from the kingpin 166 and at 90° angular spacing from each other. An extension 151 of the bottom support strap 152 of the swivel member 150 protrudes radially outward therefrom over the plane of the table plate 148. The extension 151 has a hole 159 therethrough a radial distance outward from the kingpin 166 equal to the radial distance of the holes 160, 161, 162 outward from the kingpin such that when the swivel ember 150 is rotated about the kingpin, the hole 159 in the extension 151 can be selectively aligned with any of the holes 160, 161, 162 in the table plate 148.

A latch pin 155 is provided for removable insertion through the hole 159 and any selected one of the holes 160, 161, 162, depending on the position of the beam 170 desired. When the latch pin is positioned through hole 159 and a selected one of the holes 160, 161, 162, it locks the beam 170 in the selected position. A latch pin guide 157 in the form of an inverted U-shaped frame extends upwardly from the extension 151 over the hole 159, and a hole 163 is provided in the top thereof in alignment with the hole 159 for guiding the latch pin 155. A collar 149 is provided around the midportion of the latch pin 155, and a coiled compression spring 158 is positioned between the collar 149 and the top portion of the guide 157 for urging the latch pin 155 downwardly into latched position. A handle 156 is provided at the top of latch pin 155 for ease of manipulation.

When the beam 170 is positioned to the left of the vehicle S, the latch pin is positioned through holes 159 and 160 as shown in FIGS. 14 through 16 to lock the beam in that position. Alternatively, when the beam 170 is positioned to extend straightforward of the vehicle S, the latch pin is positioned through holes 159 and 161. Further, when the beam 170 is positioned to the right of the vehicle S, the latch pin is positioned through holes 159 and 162 to lock the beam 170 in that position.

As shown in FIGS. 10 through 12, this alternative embodiment also includes a flat disk rotor 180 positioned in a substantially horizontal plane under the distal end of the beam 170 with a plurality of spring steel teeth 184 attached to and extending downwardly therefrom, similar to the embodiments described above. The disk rotor 180 is mounted on a substantially vertical drive shaft 182 which extends upwardly through the distal end of the beam 170 where it is coupled with the shaft of a hydraulic motor 176. A raised portion 174 is provided on the distal end of the beam 170 to provide a substantially horizontal mounting surface for the hydraulic motor 176, and hydraulic lines 177, 178 accommodate circulation of hydraulic fluid through the motor 176. As with the previous embodiments, a balance spring 186 is provided for depth control in combination with the spring teeth 184. It is attached at one end to a bracket 188 extending upwardly from the support members 144, 146 and at the other end to a bracket 189 attached near the distal end of the beam 170.

As mentioned above, all of the embodiments of this invention are uniquely designed for adaptation to a conventional skid turn vehicle and in combination therewith provides a versatility as well as manueverability heretofore unavailable in the prior art cultivator or tiller machines for tilling between plants in a row, yet the embodiments of this invention are conducive to simplicity of design, ease of control and effective depth or float control characteristics not found in the prior art.

Although the present invention has been described with a certain degree of particularity, it is understood that the present disclosure has been made by way of example and that changes in details and structure may be made without departing from the spirit thereof.

I claim:

1. In combination with a skid turn mobile vehicle that is adapted for steering by slowing, stopping, and reversing the rotation of the wheels on one side of the vehicle in relation to the wheels on the other side of the vehicle, rotary tiller apparatus, comprising:
   a main support frame adapted for mounting on said vehicle;
   yieldable suspension means attached to and extending laterally outward from said main support frame, the distal end of said suspension means being movable upwardly and downwardly in relation to said frame;
   a rotor assembly suspended from the distal end of said suspension means, including a vertical drive shaft, a rotor member mounted on the lower end of said shaft and a plurality of resilient cultivator means attached to and extending downwardly from said rotor member in spaced-apart relation to each other, said cultivator means being resiliently flexible elongated shank members adapted for tilling the ground; and
   drive means for rotating said shaft.

2. The rotary tiller apparatus of claim 1, including means for adjustably tilting said rotor member in such a manner that the forward leading aspect of said rotor member is spaced farther upward from the ground than the rear trailing aspect of said rotor member.

3. The rotary tiller apparatus of claim 1, including extension means for extending and retracting said rotor member laterally in relation to said main support frame.

4. The rotary tiller apparatus of claim 3, wherein said extension means includes a support plate slidably positioned adjacent the front surface of said main support frame, a pivot pin rigidly affixed to and extending outwardly from said support plate, said yieldable suspension means being pivotally mounted on said pivot pin, guide means on said support frame for confining said support plate to the position adjacent said support frame while allowing laterally slidable movement of said support plate in relation to said support frame, and a hydraulic cylinder and ram assembly, one end of which is attached to said support frame and the other end of which is attached to said pivot pin in such a manner that said support plate, pivot pin, and yieldable suspension means are movable laterally in relation to said support frame in response to linear motion of said hydraulic cylinder and ram assembly.

5. The rotary tiller apparatus of claim 4, wherein said guide means includes a pair of elongated, substantially horizontal angle members in parallel spaced-apart relation to each other attached to and extending outwardly from said support frame then toward each other, each of said angle members forming a channel between itself and said support frame, said channels opening toward each other and adapted to receive and slidably retain opposite edges of said support plate therein.

6. The rotary tiller apparatus of claim 1, including a pivotal mounting plate positioned at the distal end of said yieldable suspension means, said drive shaft extending through and journaled in said mounting plate, said plate being rotatable about an axis normal to the axis of said drive shaft.

7. The rotary tiller apparatus of claim 1, including swivel connecting means for connecting said beam to said support frame in such a manner to accommodate selectively swiveling said yieldable suspension means to extend outwardly to the left, front, and right of said support frame.

8. The rotary tiller apparatus of claim 7, wherein said swivel connecting means includes a substantially horizontal table plate attached to said support frame, a swivel member positioned on said table plate, a king pin extending through said swivel member and said table plate for rotatably connecting said swivel member to said table plate, said yieldable suspension means being pivotally connected to said swivel member.

9. The rotary tiller apparatus of claim 8, including releasable locking means on said swivel connecting means for locking said swivel connecting means in a selected one of a plurality of rotated positions.

10. The rotary tiller apparatus of claim 9, wherein said releasable locking means includes said table plate with a plurality of holes therein in angular spaced-apart relation to each other and equal radial spaced relation to said king pin, a lock pin slidably mounted on said swivel member radially a spaced distance from said king pin equal to the radial spaced distance between said holes in said table plate and said king pin, said lock pin being slidable into and out of selected ones of said holes.

11. The rotary tiller apparatus of claim 10, including lateral adjustment means on said support frame for adjustably positioning said swivel connecting means laterally from side to side on said support frame.

12. The rotary tiller apparatus of claim 11, wherein said lateral adjustment means includes a pair of substantially horizontal guide tracks affixed to said support frame in parallel spaced-apart relation to each other, a support plate slidably positioned against the front side of said guide tracks, an elongated bar rigidly affixed to said support plate and slidably positioned between said guide tracks, and a retainer plate positioned against the back side of said guide tracks, said retainer plate being releasably fastened to said bar and support plate.

13. The rotary tiller apparatus of claim 1, wherein said yieldable suspension means includes a beam pivotally attached to and extending laterally outward from said main support frame, and an elongated coiled balance spring attached at one end to said frame at a position above the pivotal attachment of said beam to said frame and attached at the other end to said beam near its distal end, said spring being in tension and adapted to apply an upwardly directed force vector to said beam of sufficient magnitude to partially offset the weight of said beam and rotor assembly applied on said teeth when they are positioned on the ground.

14. The rotary tiller apparatus of claim 1 wherein said cultivator means includes an elongated strand of spring steel, a portion of which is coiled with one end in the form of an elongated shank extending downwardly from the coiled portion and the other end being threaded and extending upwardly from the coiled portion through a hole in said rotor member, and fastener means on said threaded portion for fastening said cultivator means to said rotor member.

15. Rotary tiller apparatus adapted for mounting on a mobile vehicle equipped with vertically movable lift arms, comprising:
   a main support frame adapted for mounting on said lift arms of said vehicle;
   an elongated beam extending laterally outward from said support frame;
   connecting means for connecting one end of said beam to said support frame in a manner that accommodates both vertical and horizontal pivotal movement of the distal end of said beam in relation to said support frame, including a swivel member adapted to pivot in a substantially horizontal plane about a substantially vertical axis, a substantially vertical pin for pivotally connecting said swivel member to said support frame in a manner such that said swivel member pivots about the longitudinal vertical axis of said vertical pin, and a substantially horizontal pin in said swivel member, said one end of said beam being pivotally mounted on said horizontal pin and adapted to pivot in a substantially vertical plane about the longitudinal horizontal axis of said horizontal pin;
   a rotor member, including a disk-shaped plate positioned in a substantially horizontal plane under the distal end of said beam, a drive shaft attached to the center of said disk-shaped plate and extending upwardly through the distal end of said beam, and a plurality of tiller teeth attached to and extending downwardly from said disk-shaped plate; and
   drive means mounted on said beam and connected to said drive shaft for rotatably turning said rotor member.

16. The rotary tiller apparatus of claim 15, including a substantially horizontal table plate mounted on said support frame, said swivel member being positioned on the upper surface of said table plate, and said vertical pin extending through said table plate and said swivel member to rotatably retain said swivel member on said table plate.

17. The rotary tiller apparatus of claim 15 or 16, including releasable locking means on said connecting means for selectively locking said beam in any one of a plurality of horizontal angular positions in relation to said support frame.

18. The rotary tiller apparatus of claim 17, wherein said releasable locking means includes said table plate with a plurality of holes therein, each being spaced an equal radial distance from said vertical pin as the other holes and each being angularly spaced from each other around said vertical pin, an extension on said swivel member protruding over the plane of said table plate and having a hole therein a spaced radial distance from said vertical pin equal to the radial distance between said holes in said table plate and said vertical pin, and a latch pin slidably positioned in said hole in said extension and adapted for slidable insertion into a selected one of said holes in said table plate when said swivel member is rotated about said vertical pin to a position where said hole in said extension is aligned with said selected one of said holes in said table plate.

19. The rotary tiller apparatus of claim 15, including lateral adjustment means on said main support frame for adjustably moving said connecting means laterally in relation to said main support frame.

20. The rotary tiller apparatus of claim 19, wherein said lateral adjustment means includes two substantially horizontal guide members on said main support frame in parallel spaced apart relation to each other, a support plate slidably positioned between said guide members, and a retainer plate positioned on the opposite side of said guide members from said support plate and releasably attached to said support plate to retain said support plate in position between said guide members, said connecting means being mounted on said support plate.

21. Rotary tiller apparatus adapted for mounting on a mobile vehicle equipped with movable lift arms, comprising:
   a main support frame adapted for mounting on said lift arms of said vehicle;
   an elongated beam connected to and extending laterally outward from said support frame;
   a rotary tiller member positioned at the distal end of said beam and adapted for rotation about a vertical axis, including drive means for rotating said rotary member about said vertical axis in relation to said beam; and
   connecting means for connecting said one end of said beam to said support frame and adapted to releasably retain said beam rigidly immovable against pivotal movement in a horizontal plane relative to said support frame in any selected one of a plurality of positions within a range in which said beam is adjustably positionable to extend outward from said support frame in directions parallel to the longitudinal axis of said vehicle and transverse to the longitudinal axis of said vehicle, the longitudinal axis of said vehicle being parallel to the normal direction of travel of said vehicle, such that said rotor member is positionable forward of said vehicle and laterally to each side of said vehicle, said connecting means also being adapted to accommodate pivotal movement of said beam upwardly and downwardly in relation to said support frame as said beam is retained in any of said positions in said horizontal plane, and said lift arms on said vehicle being adapted to raise or lower the entire support frame, beam, and rotor assembly in relation to the vehicle.

* * * * *